(12) United States Patent
Yu et al.

(10) Patent No.: US 8,382,381 B2
(45) Date of Patent: Feb. 26, 2013

(54) BLIND HOLE INSERT FIXING DEVICE

(75) Inventors: Tai-Cherng Yu, Taipei Hsien (TW);
I-Thun Lin, Taipei Hsien (TW)

(73) Assignee: Hon Hai Precision Industry Co., Ltd.,
New Taipei (TW)

( * ) Notice: Subject to any disclaimer, the term of this patent is extended or adjusted under 35 U.S.C. 154(b) by 345 days.

(21) Appl. No.: 12/944,746

(22) Filed: Nov. 12, 2010

(65) Prior Publication Data

US 2011/0280519 A1    Nov. 17, 2011

(51) Int. Cl.
*G02B 6/36* (2006.01)
*G02B 6/38* (2006.01)
*G02B 6/00* (2006.01)

(52) U.S. Cl. .......... 385/53; 385/56; 385/62; 385/65; 385/83; 385/135

(58) Field of Classification Search .......... 385/53, 385/56, 62, 65, 76, 77, 81, 83, 135, 136
See application file for complete search history.

(56) References Cited

U.S. PATENT DOCUMENTS

| | | | |
|---|---|---|---|
| 6,293,708 B1 * | 9/2001 | Ohtsuka et al. | 385/72 |
| 7,182,522 B2 * | 2/2007 | Sasaki et al. | 385/53 |
| 7,331,721 B2 * | 2/2008 | Dudek et al. | 385/89 |

* cited by examiner

*Primary Examiner* — Brian Healy
*Assistant Examiner* — Hung Lam
(74) *Attorney, Agent, or Firm* — Altis Law Group, Inc.

(57) ABSTRACT

A blind hole insert fixing device is configured for fixing a number of blind hole inserts. The blind hole insert fixing device includes a hollow housing defining a cavity and an engagement member received in the cavity. The housing includes a first inner surface and an opposing second inner surface in the cavity. The engagement member includes a body portion, a number of spring portions, and a number of engagement portions conforming to the blind hole inserts. The spring portions and the engagement portions are located at opposite sides of the body portion. The spring portions abut against the first inner surface. The engagement portions and the second inner surface cooperatively form a number of receiving spaces for receiving the blind hole inserts. The spring portions are configured for applying a force to the body portion in a direction away from the first inner surface.

10 Claims, 7 Drawing Sheets

BLIND HOLE INSERT FIXING DEVICE

BACKGROUND

1. Technical Field

The present disclosure relates to optical technology and, particularly, to a blind hole insert fixing device used in an optical connector molding die.

2. Description of Related Art

Optical connectors are preferred for use in data transmission between electronic devices due to their high transmission speed and signal integrity. An optical connector includes a number of blind holes for precisely receiving optical fibers and a number of lenses aligned with the optical fibers. When the optical connector is assembled, each optical fiber is inserted into a corresponding blind hole in front of a corresponding lens and fixed in a predetermined position by ultraviolet-curable glue.

Generally, the optical connector is molded by an optical connector molding die. The optical connector molding die includes a mold body and a number of blind hole inserts. After the blind hole inserts are coupled with a fixing device, the blind hole inserts with the fixing device are then inserted into the mold body. However, if the blind hole inserts are coupled with the fixing device by a interference fit, the blind hole inserts are easily broken. If the blind hole inserts are coupled with the fixing device by a clearance fit, the blind holes cannot be aligned with the lenses after the optical connector is molded. As a result, the transmission accuracy and efficiency of the optical connector decreases.

Therefore, it is desirable to provide a blind hole insert fixing device used in the optical connector molding die, which can overcome or at least alleviate the above-mentioned problems.

DETAILED DESCRIPTION

Figure 1:
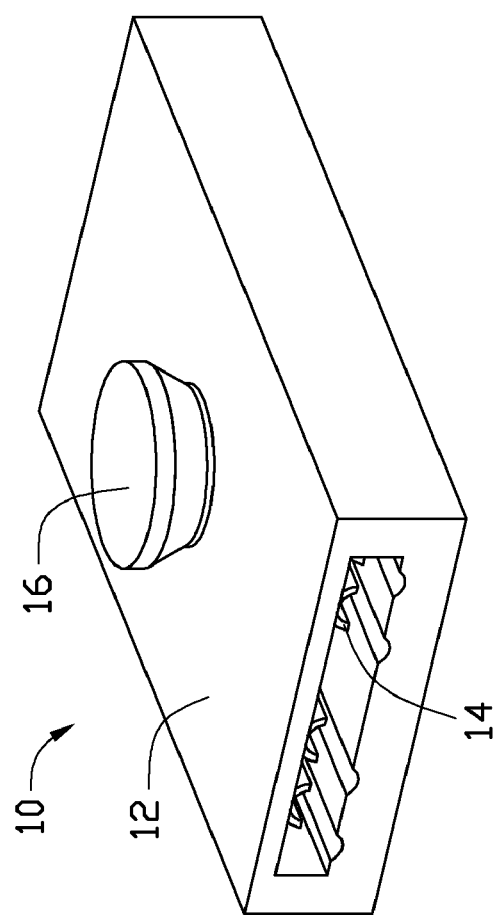
FIG. 1 is a schematic, isometric view of a blind hole insert fixing device including an engagement member and a connection member, according to a first exemplary embodiment.

Referring to FIG. 1, a blind hole insert fixing device 10 for fixing four blind hole inserts 20 (shown in FIG. 4) in an optical connector molding die (not shown), according to a first exemplary embodiment, includes a housing 12, an engagement member 14, and a connection member 16.

Figure 2:
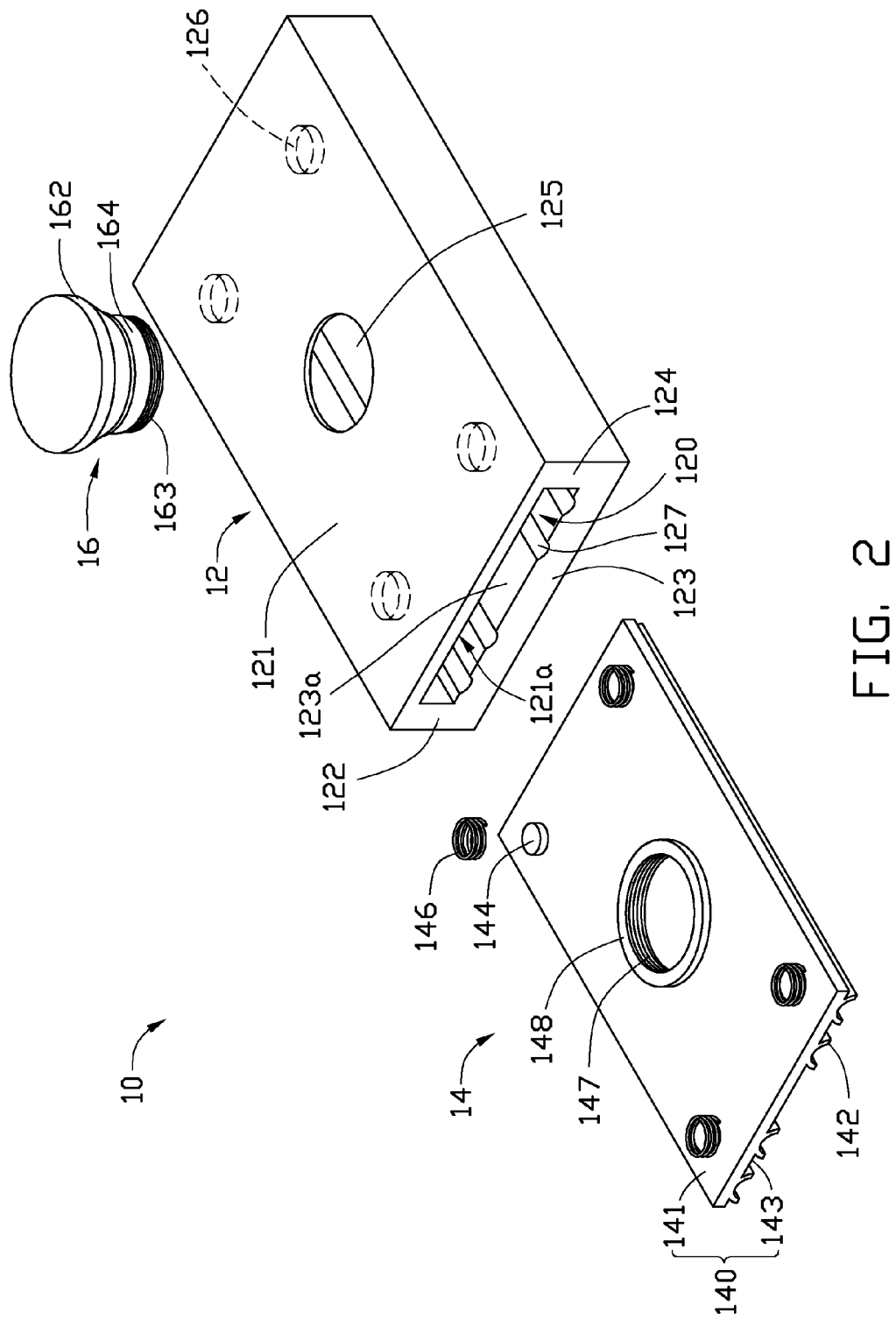
FIG. 2 is an exploded view of the blind hole insert fixing device of FIG. 1.
Figure 3:
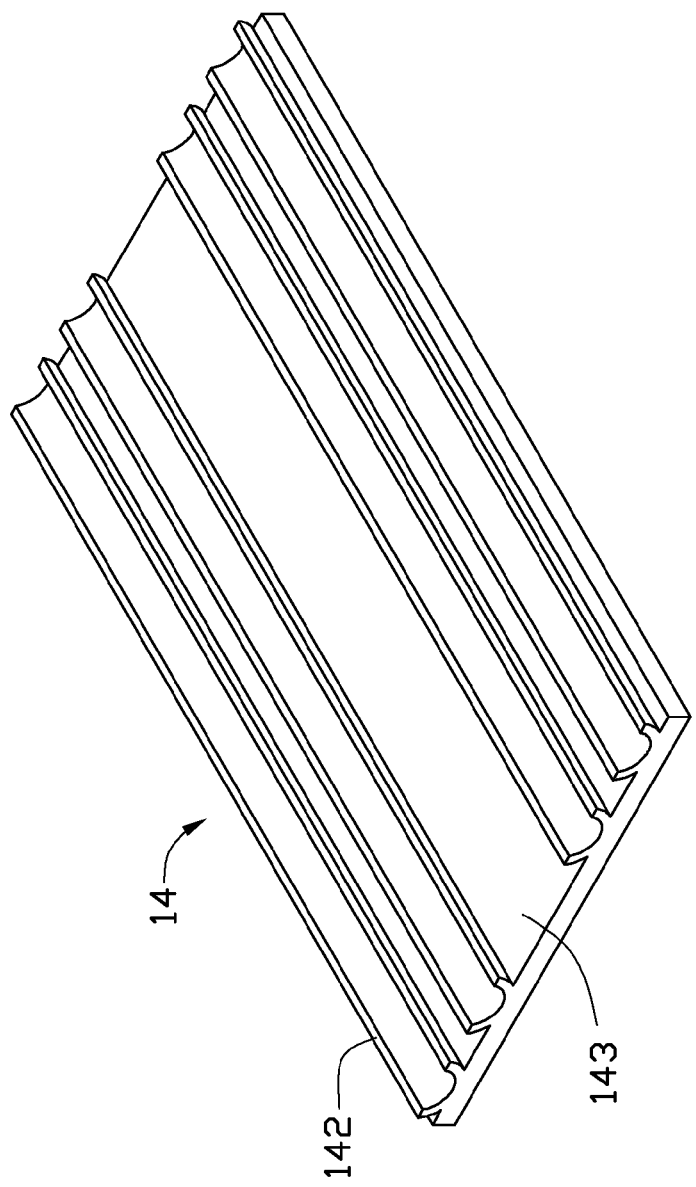
FIG. 3 is a schematic, isometric view of the engagement member of FIG. 1.

Referring to FIGS. 2-3, the housing 12 is substantially a hollow cube and defines a cavity 120. The housing 12 includes a first sidewall 121 having a first inner surface 121a, a second sidewall 123 having a second inner surface 123a, a third sidewall 122, and a fourth sidewall 124. The first sidewall 121 is substantially parallel to the second sidewall 123. The third sidewall 122 is substantially parallel to the fourth sidewall 124. The first sidewall 121, the second sidewall 123, the third sidewall 122, and the fourth sidewall 124 are connected to each other end-to-end. A through hole 125 is defined in a center of the first sidewall 121. The first inner surface 121a is opposite to the second inner surface 123a. Four recesses 126 are defined in the first inner surface 121a. Four grooves 127 are defined in the second inner surface 123a. The groove 127 corresponds to the blind hole insert 20 (shown in FIG. 4).

The engagement member 14 is received in the cavity 120. The engagement member 14 includes a body portion 140, four engagement portions 142, four protrusions 144, four spring portions 146, and a connection portion 148.

The body portion 140 includes a first surface 141 and a second surface 143. The first surface 141 and the second surface 143 are positioned at opposite sides of the body portion 140. The first surface 141 is opposite to the first inner surface 121a. The second surface 143 is opposite to the second inner surface 123a.

Figure 4:
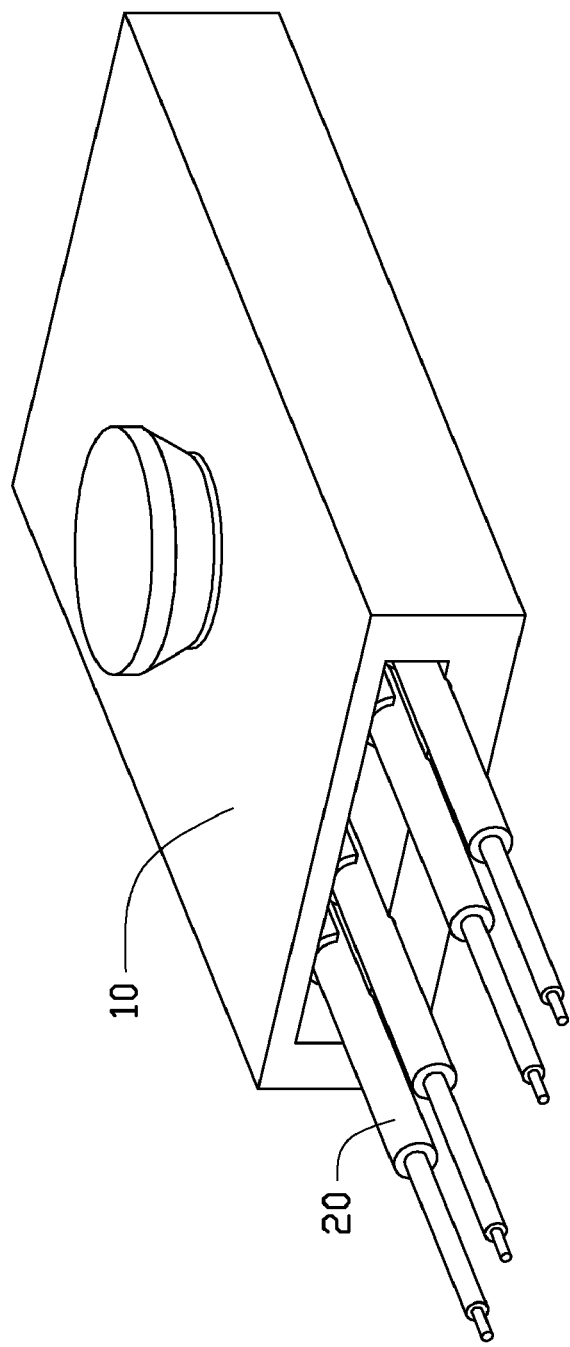
FIG. 4 shows the blind hole insert fixing device of FIG. 1 in a state of being coupled with blind hole inserts.

The four engagement portions 142 extend from the second surface 143 and conform to the four blind hole inserts 20 (shown in FIG. 4). The four engagement portions 142 and the four grooves 127 cooperatively form four receiving spaces 145 (shown in FIG. 5) to receive the four blind hole inserts 20.

The four protrusions 144 extend from the first surface 141 at four corners of the first surface 141 of the body portion 140. The four protrusions 144 correspond to the four recesses 126. Each protrusion 144 is received in a corresponding recess 126 and is apart from the bottom of the recess 126.

The four spring portions 146 respectively surround the four protrusions 144. One end of each spring portion 146 is connected to the first surface 141, and the other end is in contact with the bottom of the recess 126. In this embodiment, the spring portions 146 are compressible coil springs.

The connection portion 148 is substantially positioned at a center of the first surface 141 of the body portion 140 and corresponds to the through hole 125. In this embodiment, the connection portion 148 is a hollow cylinder extending from the first surface 141 conforming to the through hole 125. The diameter of the connection portion 148 is slightly less than that of the through hole 125 so that the connection portion 148 can extend through the through hole 125. An internal thread 147 is formed on an inner sidewall of the connection portion 148.

The connection member 16 includes a grip 162 and a post 164 extending from the grip 162. The grip 162 has a greater size than the through hole 125. An external thread 163 is formed on an outer sidewall of the post 164. The post 164 extends through the through hole 125 and the external thread 163 engages with the internal thread 147 so that the connection member 16 is connected to the connection portion 148. The grip 162 is exposed outside the housing 12.

It is to be understood that in alternative embodiments, the connection member 16 may be connected to the connection portion 148 by glue or a welding joint.

When the blind hole insert fixing device 10 is assembled, the engagement member 14 is inserted into the cavity 120 to make the protrusions 144 received in the recesses 126. The post 164 extends through the through hole 125 and the external thread 163 engages with the internal thread 147 so that the connection member 16 is connected to the connection portion 148. In an initial state, the spring portions 146 applies a force to the body portion 140 in a direction that from the first surface 141 to the second surface 143. The grip 162 abuts an outer surface 128 of the first sidewall 121 and is exposed outside the housing 12.

Figure 5:
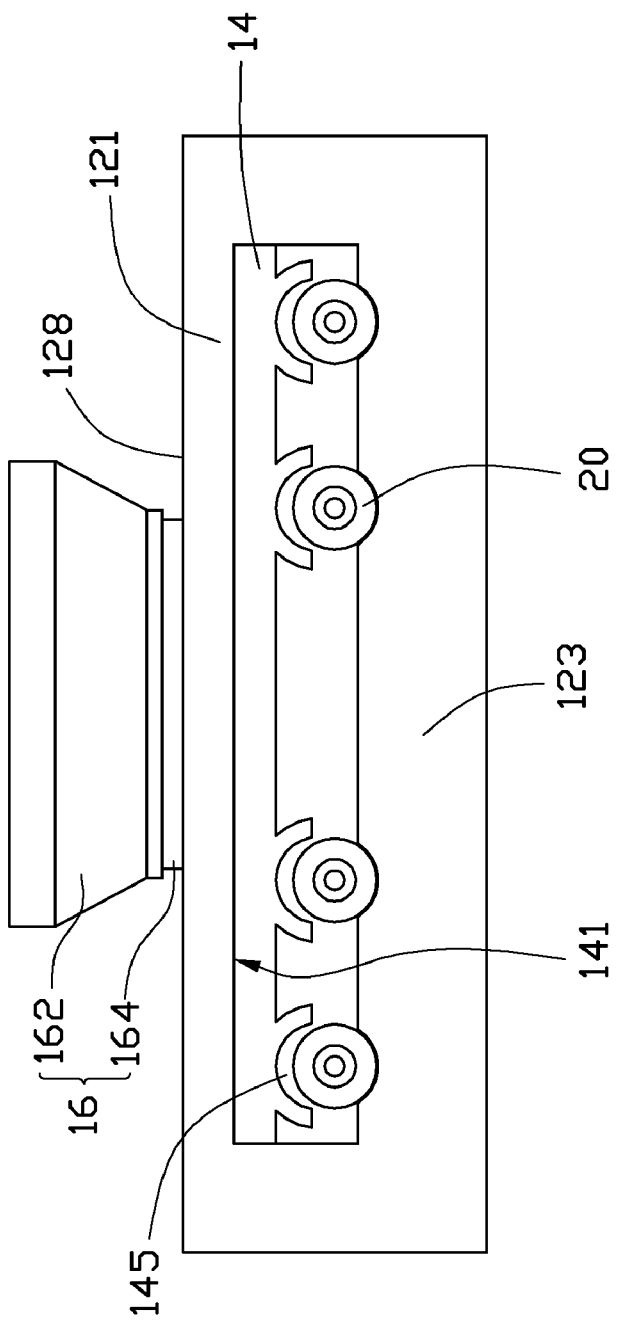
FIG. 5 shows the engagement member of FIG. 1 in a state of being pulled by the connection member.
Figure 6:
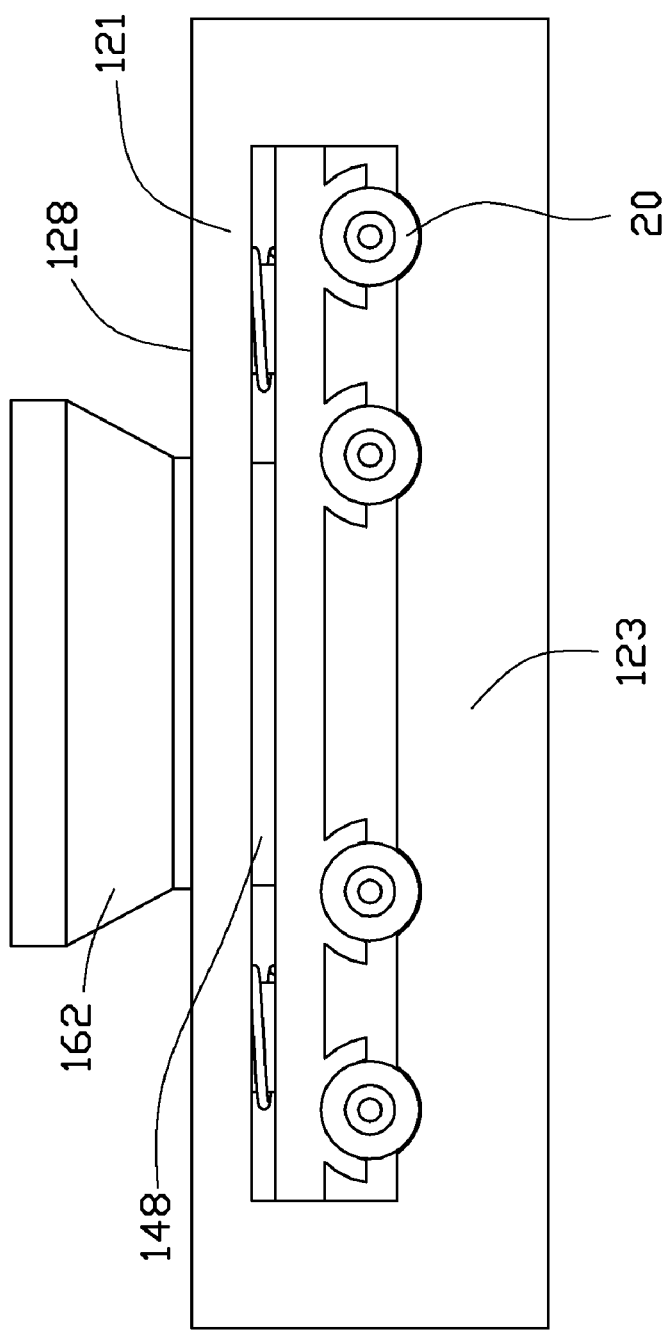
FIG. 6 shows the engagement member of FIG. 1 in a state of being engaged with the blind hole inserts.

Referring to FIG. 2 together with FIGS. 4-6, when the blind hole inserts 20 are coupled to the blind hole insert fixing device 10, the grip 162 is pulled to move away from the outer surface 128. The body portion 140 moves toward the first sidewall 121 to enlarge the receiving spaces 145. In this state, the spring portions 146 and the protrusions 144 are totally received in the recesses 126. The first surface 141 abuts the first sidewall 121. The post 164 is exposed outside the outer surface 128, and the connection portion 148 is totally received in the through hole 125. The blind hole inserts 20 are inserted into the receiving spaces 145. The grip 162 is released so that the spring portions 146 press the body portion 140 to move away from the first sidewall 121. The grip 162 moves toward the second sidewall 123 with the movement of the body portion 140 until the grip 162 abuts the outer surface 128. In this state, the blind hole inserts 20 are engaged by the blind hole insert fixing device 10. This avoids using a clearance fit or an interference fit. As a result, the blind hole inserts 20 are not easily broken, and the blind holes are aligned with the lenses after an optical connector is molded. Therefore, the transmission accuracy and efficiency of the optical connector increase.

Figure 7:
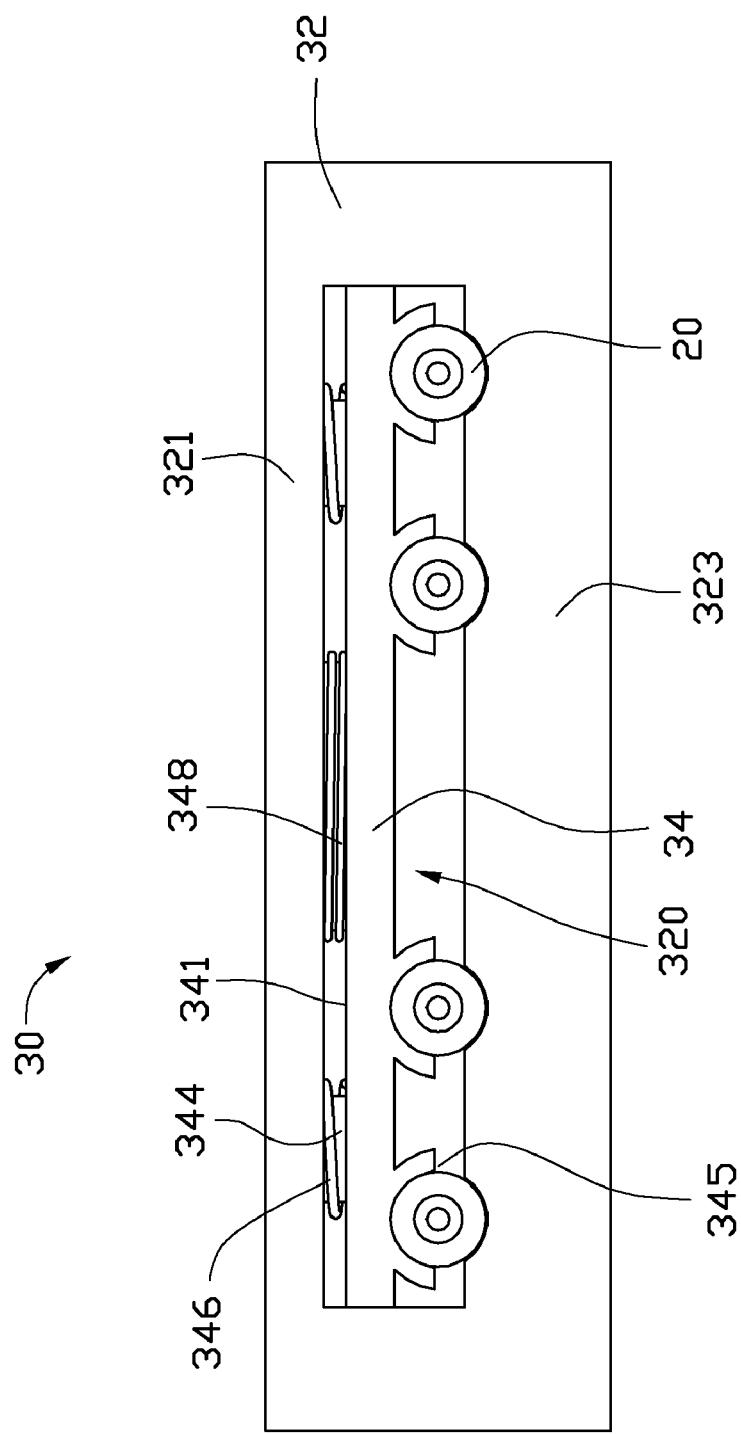
FIG. 7 shows an engagement member in a state of being engaged with blind hole inserts, according to a second exemplary embodiment.

Referring to FIG. 7, a blind hole insert fixing device 30, according to a second exemplary embodiment, is shown. The differences between the blind hole insert fixing device 30 of this embodiment and the blind hole insert fixing device 10 of the first embodiment are: the blind hole insert fixing device 30 omits the connection member. A receiving groove (not shown) replaces the through hole. The connection portion 348 is a compressible spring. One end of the connection portion 348 is fixed to the first surface 341, and the other end of the connection portion 348 abuts a bottom of the receiving groove (not shown).

When the blind hole inserts 20 are coupled to the blind hole insert fixing device 30, the engagement member 34 in the cavity 320 is pressed toward the first sidewall 321 to enlarge the receiving spaces 345. In this state, the spring portions 346 and the protrusions 344 are totally received in the recesses (not shown). The connection portion 348 is totally received in the receiving groove and the first surface 341 abuts the first sidewall 321. The blind hole inserts 20 are inserted into the receiving space 345. The engagement member 34 is released so that the spring portions 346 and the connection portion 348 press the engagement member 34 to move toward the second sidewall 323 until the blind hole inserts 20 are engaged by the blind hole insert fixing device 30.

The advantages of the blind hole insert fixing device 30 of the second embodiment are similar to those of the blind hole insert fixing device 10 of the first embodiment. Further, the blind hole insert fixing device 30 omits the connection member. This simplifies the making method of the blind hole insert fixing device 30 and keeps the cost down.

It is to be understood, however, that even though numerous characteristics and advantages of the present embodiments have been set forth in the foregoing description, together with details of the structures and functions of the embodiments. The disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A blind hole insert fixing device for fixing a plurality of blind hole inserts, the blind hole inserts configured for molding blind holes for receiving optical fibers in an optical connector, the blind hole insert fixing device comprising:
a hollow housing defining a cavity, the housing having a first inner surface and an opposing second inner surface in the cavity; and
an engagement member received in the cavity, the engagement member comprising a body portion, a plurality of spring portions, and a plurality of engagement portions conforming to the blind hole inserts, the spring portions and the engagement portions located at opposite sides of the body portion, the spring portions abutting against the first inner surface in the cavity, the engagement portions and the second inner surface cooperatively forming a plurality of receiving spaces for receiving the blind hole inserts, the spring portions configured for applying a force to the body portion in a direction away from the first inner surface.

2. The blind hole insert fixing device as claimed in claim 1, wherein the body portion is substantially plate-shaped and movable between the first and second inner surfaces.

3. The blind hole insert fixing device as claimed in claim 2, wherein a plurality of recesses are defined in the first inner surface receiving the respective spring portions, and a plurality of grooves are defined in the second inner surface spatially corresponding to the engagement portions, the engagement portions and the grooves cooperatively form the receiving spaces for receiving the blind hole inserts.

4. The blind hole insert fixing device as claimed in claim 3, wherein the spring portions are compressible coil springs.

5. The blind hole insert fixing device as claimed in claim 4, wherein the body portion comprises a first surface and an opposing second surface, the engagement member further comprises a plurality of protrusions extending from the first surface, the spring portions surround the respective protrusions, one end of each spring portion is connected to the first surface, and the other end of each spring portion is engaged in the corresponding recess, the protrusions are spaced apart from the bottoms of the recesses, and the engagement portions are positioned at the second surface.

6. The blind hole insert fixing device as claimed in claim 5, wherein the engagement member is resiliently engaged with the first inner surface.

7. The blind hole insert fixing device as claimed in claim 6, wherein the engagement member further comprises a connection portion, one end of the connection portion is connected to the first surface, and the other end of the connection portion is in contact with the first inner surface.

8. The blind hole insert fixing device as claimed in claim 5, further comprising a connection member, wherein a through hole is defined in the housing through the first inner surface, the engagement member further comprises a connection portion extending from the first surface, the connection portion having a shape conforming to the through hole, the connection member extends through the through hole and engaged with the connection portion.

9. The blind hole insert fixing device as claimed in claim 8, wherein the connection member comprises a grip and a post extending from the grip, the post extends through the through hole and is connected to the connection portion, and the grip is exposed outside the housing.

10. A blind hole insert fixing device for fixing a plurality of blind hole inserts, the blind hole inserts configured for insert molding blind holes for receiving optical fibers in an optical connector, the blind hole insert fixing device comprising:
a housing defining a first through hole, the housing including a first sidewall and an opposing second sidewall at opposite sides of the first through hole, the housing defining a second through hole in the first sidewall, the second through hole in communication with the first through hole, the second sidewall comprising a plurality of parallel first groove portions facing the first sidewall; and a plate-shaped body portion being received in the first through hole and movable between the first and second sidewalls, the body portion comprising a plurality of parallel second groove portions facing the second sidewall and a plurality of spring portions facing the first sidewall, the spring portions configured for applying a resilient force to the body portion in a direction away from the first sidewall, the second groove portions and the first groove portions aligned with each other and cooperatively forming a plurality of pairs of clamps for clamping the blind hole inserts therebetween; and a unitary handle having a first portion extending though the second through hole and secured to the body portion and a second portion exposed outside the housing.

* * * * *

UNITED STATES PATENT AND TRADEMARK OFFICE
CERTIFICATE OF CORRECTION

PATENT NO. : 8,382,381 B2  
APPLICATION NO. : 12/944746  
DATED : February 26, 2013  
INVENTOR(S) : Tai-Cherng Yu et al.

Page 1 of 1

It is certified that error appears in the above-identified patent and that said Letters Patent is hereby corrected as shown below:

Title Page, below Item (65) insert

-- (30) Foreign Application Priority Data

May 11, 2010 (TW) ..........................99114920 --

Signed and Sealed this  
Thirty-first Day of December, 2013

Margaret A. Focarino  
*Commissioner for Patents of the United States Patent and Trademark Office*